(12) United States Patent
Brown et al.

(10) Patent No.: US 7,501,801 B2
(45) Date of Patent: Mar. 10, 2009

(54) POWER SUPPLY OUTPUT VOLTAGE TRIMMING

(75) Inventors: David Alan Brown, Carp (CA); Mircea Cristian Boros, Ottawa (CA)

(73) Assignee: Potentia Semiconductor Inc., DE (US)

( * ) Notice: Subject to any disclaimer, the term of this patent is extended or adjusted under 35 U.S.C. 154(b) by 535 days.

(21) Appl. No.: 11/169,629

(22) Filed: Jun. 30, 2005

(65) Prior Publication Data

US 2007/0001715 A1 Jan. 4, 2007

(51) Int. Cl.
*G05F 1/613* (2006.01)
*G05F 1/00* (2006.01)

(52) U.S. Cl. ........................ 323/224; 323/283

(58) Field of Classification Search ............... 323/283, 323/211, 243, 222, 224; 363/21.05, 21.13, 363/95, 97, 98
See application file for complete search history.

(56) References Cited

U.S. PATENT DOCUMENTS

| | | | | |
|---|---|---|---|---|
| 4,719,402 | A * | 1/1988 | Brennen et al. | 323/211 |
| 5,488,553 | A * | 1/1996 | Renger | 363/21.05 |
| 7,057,907 | B2 * | 6/2006 | Oh | 363/21.05 |
| 7,141,956 | B2 * | 11/2006 | Chapuis | 323/283 |
| 7,152,010 | B1 * | 12/2006 | Tsyrganovich | 702/107 |
| 7,221,131 | B2 * | 5/2007 | Ozawa et al. | 323/272 |
| 7,245,512 | B2 * | 7/2007 | Leung et al. | 363/95 |
| 2006/0208716 | A1 * | 9/2006 | Chapuis | 323/283 |
| 2006/0261794 | A1 * | 11/2006 | May | 323/283 |

OTHER PUBLICATIONS

"How you can manage multiple voltages in portables"; Tom DeLurio and George Hall; Power Management DesignLine; Mar. 23, 2005.
SMM665, 605, 205, 105 Supply Voltage Marginers and Active DC Output Controllers Component Selection for Optimum Performance; Summit Microelectronics, Inc.; 2003; Application Note 37; pp. 1 to 3.
"Single-Channel Supply Voltage Marginer and Active DC Output Controller"; Summit Microelectronics, Inc; 2005; SMM105; pp. 1-21.
"SMM105/205/605/665 ADOC Tutorial and Performance Summary"; Summit Microelectronics, Inc.; 2003; Application Note 39; pp. 1-11.
"Reference Design Kit Quik-Start User's Guide"; Summit Microelectronics; Inc.; 2004; SMM105REF; pp. 1-13.

* cited by examiner

*Primary Examiner*—Shawn Riley

(57) ABSTRACT

A power supply trim control signal is produced by integrating differences between monitored and target values of the output voltage of a power supply. Register storage requirements are reduced by producing the target value from a nominal voltage value and one of a plurality of margin offsets selected in accordance with control data. The control data also selects between open and closed loop trim control. Stability is enhanced by changing the target value slowly in response to any change in the control data.

18 Claims, 2 Drawing Sheets

POWER SUPPLY OUTPUT VOLTAGE TRIMMING

This invention relates to trimming the output voltage of a power supply, such as a DC-DC converter or voltage regulator. DC-DC converters are also referred to as DC, DC-DC, or switch mode regulators, converters, power supplies, POL (point-of-load) modules, etc.; the term "DC-DC converter" or "converter" is used herein to include all such terms. Voltage regulators operate in a linear mode to provide a regulated output voltage, and desirably have a low drop-out (LDO) voltage between input and output voltages of the regulator. The term "power supply" is used herein to include both converters and regulators.

BACKGROUND

It is known to provide a regulated output voltage from a power supply, the power supply including a closed loop feedback path to maintain its regulated output voltage at a desired level, referred to as a set-point. For example, a predetermined fraction of the output voltage of the power supply may be compared with a reference voltage, and the result of the comparison may be used to control a PWM (pulse width modulation) function of a DC-DC converter or a control element of a linear voltage regulator.

It is also known to provide a power supply with a trim input, to which a control signal can be supplied to trim the output voltage of the power supply. For example, such trimming can be used to adjust the output voltage to a desired value, to compensate for changes of the power supply characteristics due to temperature changes or aging, or for margining, in which for example the output voltage of the power supply is raised or lowered from the set-point to test operation of a supplied electronic circuit at supply voltages above and below its nominal supply voltage. This is referred to as active trim or active DC output control of the power supply.

Active trim can be carried out in an open loop or a closed loop manner. In open loop active trim, the trim input of the power supply is controlled in a desired manner without this control being dependent upon monitoring of the power supply output voltage. With closed loop active trim, the trim input of the power supply is controlled in a manner dependent upon, for example, the monitored output voltage of the power supply.

Consequently, with closed loop active trim there are two closed loops which control the power supply. Stable operation of the power supply requires that the closed loop active trim not interfere with the power supply voltage regulating closed loop; this may be difficult to ensure under all operating conditions, including for example initial start-up conditions and voltage changes for margining.

It is known for example from Summit Microelectronics, Inc. Application Note 39 entitled "SMM105/205/605/665 ADOC Tutorial and Performance Summary" dated Jun. 19, 2003, and from an article by Tom DeLurio and George Hall entitled "How you can manage multiple voltages in portables", Power Management DesignLine newsletter, Mar. 23, 2005, to provide closed loop active DC output control of a power supply, using significant filtering and signal conditioning of the power supply output voltage to produce a voltage which is compared with a reference voltage to control charging of a capacitor. The control signal for the trim input of the power supply is dependent upon the voltage to which the capacitor is charged.

To reduce the risks of instability, in such a known arrangement the active DC output control loop has a response that is much slower than the response of the power supply voltage regulating closed loop, and in addition uses a nonlinear digital control element where adjustments of the output are always of the same magnitude. However, this introduces a ripple voltage on the power supply output voltage. Although, as described in Summit Microelectronics, Inc. Application Note 37 entitled "SMM665, 605, 205, 105 Supply Voltage Marginers and Active DC Output Controllers Component Selection for Optimum Performance" dated Jun. 18, 2003, the magnitude of the ripple voltage can be reduced by increasing the capacitance of the capacitor, this increases the margin settling time.

In such power supply control arrangements, parameters such as the nominal voltage, minimum and maximum voltages for margining, and control parameters may be stored in an EEPROM or other non-volatile memory and may be downloaded into shadow registers of a control unit on power-up. The control unit may be provided for controlling a plurality of power supplies, in which case it requires such shadow registers for each of the power supplies that it can control. As the shadow registers require a significant proportion of the total area of an integrated circuit implementation of the control unit, it is desirable to reduce as much as possible the size of (number of bits stored by) the shadow registers, without detracting from the operation or accuracy of the control unit.

Accordingly, it is desirable to provide improvements in power supply output voltage trimming and in a control unit for such trimming.

SUMMARY OF THE INVENTION

According to one aspect of this invention there is provided a method of trimming an output voltage of a power supply, comprising the steps of: storing values representing a nominal value of the output voltage, a plurality of margin values, and control data in a non-volatile store; and, in a control unit: in dependence upon the control data, selecting one of the plurality of margin values and combining it with the nominal value of the output voltage to produce a target value of the output voltage; monitoring the output voltage of the power supply; integrating differences between monitored values of the output voltage and the target value to produce a control signal; and supplying the control signal to a trim input of the power supply to trim the output voltage of the power supply to reduce said differences.

Preferably said values are digital values, the method including the step of converting the monitored output voltage to a digital value and converting a digital value representing the control signal to an analog signal.

In an embodiment of the invention, the step of integrating differences comprises forming said differences using an arithmetic logic unit and accumulating the differences in less significant bit positions of an accumulator having more significant bit positions from which the control signal is derived.

Preferably the step of combining a selected one of the margin values with the nominal value of the output voltage to produce a target value of the output voltage is responsive to a change of the control data to make any change of the target value gradually at a slow rate.

Conveniently the control unit can be responsive to an indication of open loop control in the control data to produce the control signal from a selected one of the plurality of margin values instead of integrating differences between monitored values of the output voltage and the target value, and to supply the nominal value of the output voltage as the target value of the output voltage.

Another aspect of the invention provides a control arrangement for trimming an output voltage of a power supply, comprising: a non-volatile store for storing values representing a nominal value of the output voltage, a plurality of margin values, and control data; and a control unit comprising: logic responsive to the control data for combining the nominal value of the output voltage with a selected one of the margin values to produce a target value of the output voltage; a register for storing the target value; a monitoring circuit for monitoring the output voltage of the power supply to produce monitored values of the output voltage; logic for forming differences between the monitored values of the output voltage and the target value; and an integrator for integrating said differences to produce a control signal for supply to a trim input of the power supply to trim the output voltage of the power supply to reduce said differences.

The integrator can comprise an accumulator having less significant bit positions to which said differences are supplied and more significant bit positions from which the control signal is derived. The control arrangement can include a digital-to-analog converter for producing the control signal from a digital value representing the control signal. The monitoring circuit can comprise an analog-to-digital converter for producing the monitored values as digital values.

The logic for combining the nominal value of the output voltage with a selected one of the margin values to produce a target value of the output voltage can include a circuit responsive to a change of the control data to make any change of the target value occur gradually at a slow rate.

The control unit can be responsive to an indication of open loop control in the control data to produce the control signal from a selected one of the plurality of margin values instead of integrating said differences, and to supply the nominal value of the output voltage as the target value of the output voltage.

The invention also provides a combination of a control arrangement as recited above and a power supply having a trim input connected to receive the control signal from the control arrangement for trimming the output voltage of the power supply.

A further aspect of the invention provides a controller for a power supply having a trim input for trimming an output voltage of the power supply, the controller comprising: an analog-to-digital converter for producing a digital value representing an output voltage of the power supply; a digital-to-analog converter for producing a trim signal, for coupling to the trim input of the power supply, from a digital value representing the control signal; storage locations for storing information for producing the digital value representing the control signal, the storage locations including locations for bits of control data and bits of a target value register; logic responsive to the control data for selecting one of a plurality of digital values representing respective margins for the output voltage of the power supply and combining it with a digital value representing a nominal value of an output voltage of the power supply to produce a digital value representing a target value of the output voltage of the power supply and for storing this in the target value register; logic for forming a difference between the target value in the target value register and the digital value representing the output voltage of the power supply; and an integrator for integrating successive values of said difference to produce the digital value representing the control signal.

The controller can include a non-volatile store for storing the control data and digital values representing said margins and nominal value of the output voltage of the power supply. The invention further extends to the combination of a controller as recited above and a power supply, the power supply having an output coupled to an input of the analog-to-digital converter and having a trim input coupled to receive the trim signal from the digital-to-analog converter.

BRIEF DESCRIPTION OF THE DRAWINGS

The invention will be further understood from the following description by way of example with reference to the accompanying drawings, in which.

DETAILED DESCRIPTION

Figure 1:
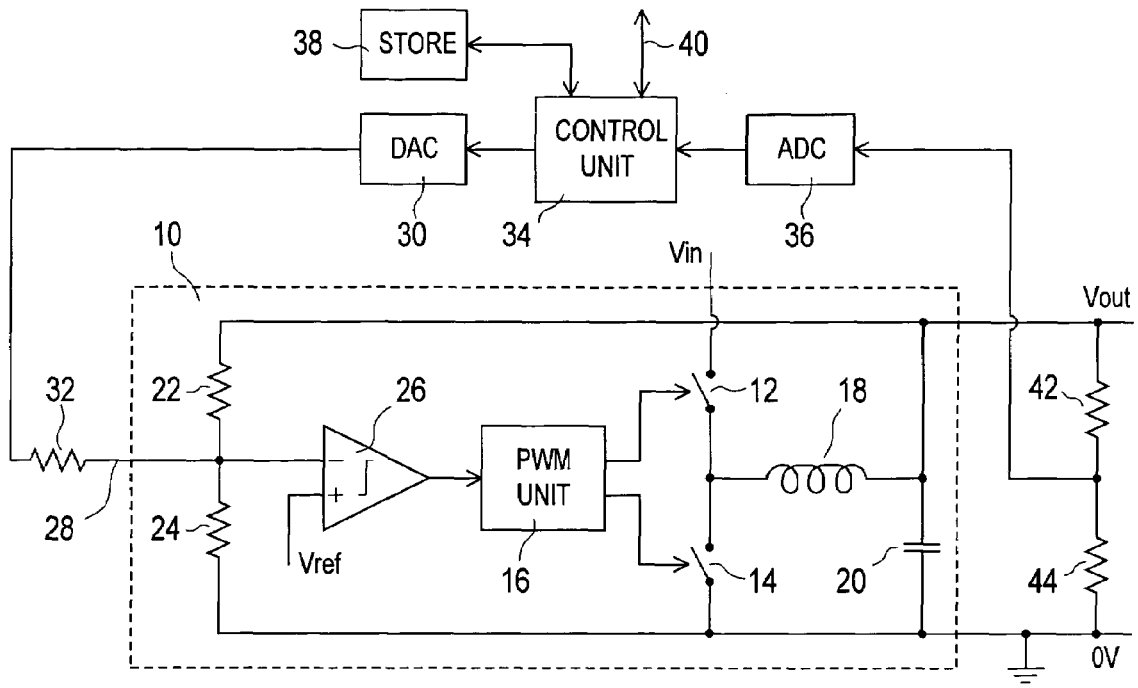
FIG. 1 schematically illustrates a DC-DC converter with an active trim control unit.

Referring to the drawings, FIG. 1 illustrates a known form of DC-DC converter 10, illustrated within a dashed-line box, which operates to produce a regulated output voltage Vout from an input voltage Vin.

The converter 10 shown in FIG. 1 comprises switches 12 and 14 (typically MOSFETs) controlled by a PWM (pulse width modulation) unit 16 for coupling an input voltage Vin via an inductor 18 to a capacitor 20 to produce an output voltage Vout. A fraction of the output voltage Vout is produced by a potential divider, formed by resistors 22 and 24, and supplied to an inverting (−) input of a comparator 26, a non-inverting (+) input of which is supplied with a reference voltage Vref. An output of the comparator 26 controls the PWM unit 16 in a closed loop feedback control arrangement, whereby the output voltage Vout is regulated in accordance with the reference voltage Vref and parameters of the circuit, in particular resistances of the resistors 22 and 24.

The junction of the resistors 22 and 24 also constitutes a trim input 28 of the converter 10, which can be used as described below to adjust or trim the output voltage Vout.

It will be appreciated that the converter 10 as shown in FIG. 1 is given purely by way of example of a power supply and not by way of limitation. The power supply can have any desired form, and in particular it can be any switch mode converter or it can be a linear voltage regulator. The invention is not limited to any specific form of power supply, and the form of converter 10 shown in FIG. 1 is given only to assist in fully describing an embodiment of the invention.

FIG. 1 also shows an active trim control unit coupled to the converter 10, including a digital-to-analog converter (DAC) 30 which produces an output voltage which is coupled via a resistor 32 to the trim input 28 of the converter 10. The active trim control unit also includes a control unit 34 for supplying a digital output to the DAC 30, and an analog-to-digital converter (ADC) 36 having a digital output to the control unit 34. The control unit 34 can receive data from a non-volatile store 38, for example an EEPROM, as described below, and has a serial interface 40 for communications with a separate device such as a computer.

As shown in FIG. 1, the output voltage Vout of the converter 10 is also supplied to a potential divider, formed by resistors 42 and 44, a tapping point of which provides an input voltage to the ADC 36 for monitoring of the converter output voltage Vout by the active trim control unit.

The active trim control unit of FIG. 1 can operate in either an open loop or a closed loop manner. For open loop operation, the digital control of the DAC 30 by the control unit 34 to supply a trim control voltage to the trim input 28 of the converter 10 is not dependent upon any monitoring of the output voltage Vout of the converter 10 via the ADC 36. For closed loop control, a second closed loop via the ADC 36 is used to provide feedback to the control unit 34, facilitating more precise trimming of the converter output voltage Vout. In either case, the converter output voltage Vout can be adjusted to a desired value different from a nominal set-point value, to compensate for changes over time or with temperature, and/or for example for margining as discussed above.

For controlling the converter 10 using the active trim control unit, on initial supply of power to the arrangement control data that is stored in the store 38 is transferred to registers, referred to as shadow registers, in the control unit 34, and subsequently the information in the shadow registers is used for the control. The information stored in the store 38, and the information stored in the shadow registers, can be modified via the serial interface 40. Although only one converter 10 or power supply is referred to here, it can be appreciated that the same components (with different shadow registers) of the active trim control unit can be used multiply for control of a plurality of different power supplies using respective control channels. Further, it can be appreciated that other control functions, for example for enabling the converter 10 via an enable input (not shown), and for comparing the output voltage Vout with under-voltage and over-voltage thresholds, can also be provided via the control unit 34.

For example, a single active trim control unit can be provided for a plurality of power supplies, comprising DC-DC converters and/or linear voltage regulators, provided on a circuit board for supplying respective supply voltages to circuits on the circuit board. Accordingly, it is desirable to minimize the storage that is required in the shadow registers of the control unit 34 for each power supply that may be controlled, without detracting from the control functions or their accuracy, in order to minimize the size and cost of an integrated circuit used for implementing the control functions. The same constraints do not apply for the store 38, which can have a relatively large storage capacity and is only required to be written to and read from at relatively slow speeds.

For example, for a conventional open loop control for margining, it may be desired to download from the store 38 to the shadow registers an 8-bit value for each of nominal, minimum, and maximum voltage values of the output voltage Vout of the converter 10, and 3 associated control bits (two for selecting one of the three voltage values, and one for switching the active trim control on or off by tri-stating the output of the DAC 30), for a total of 27 bits for this storage.

Figure 2:
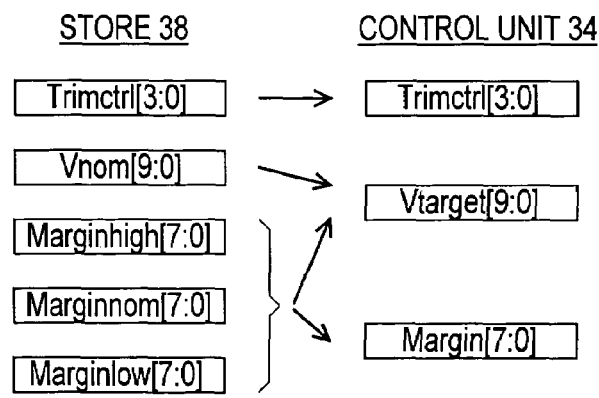
FIG. 2 illustrates a data downloading arrangement for the control unit of FIG. 1 in accordance with an embodiment of this invention.

FIG. 2 illustrates an arrangement for downloading data from the store 38 to registers in the control unit 34, in accordance with an embodiment of this invention, which enables the incremental number of storage elements required in the control unit 34 to be reduced.

Referring to FIG. 2, as shown on the left-hand side, active trim data stored in the store 38 for controlling the converter 10 comprises 4 bits of control data Trimctrl[3:0], a 10-bit nominal voltage value Vnom[9:0] which represents a desired output voltage of the converter 10, and three 8-bit offsets from the nominal voltage value, referred to as Marginhigh[7:0], Marginnom[7:0], and Marginlow[7:0]. These are digital differences from the nominal voltage value, used for example for margining as discussed further below. In each case the bracketed numbers refer to the bits of the respective value in conventional manner; for example Marginlow[7:0] refers to a digital value called Marginlow having 8 bits which are numbered from 7 to 0.

Instead of this data all being downloaded from the store 38 into registers of the control unit 34 on power-up as discussed above, requiring a relatively large number of bit locations in the registers of the control unit 34, the storage requirements of the control unit 34 are reduced by arranging its registers in a different manner, as described below with reference to the right-hand side of FIG. 2.

More particularly, the control unit 34 includes a shadow register for the 4-bit control data Trimctrl[3:0], which comprises three control bits as described above (two bits for selecting one of the three margin values, and one bit for tri-stating the output of the DAC 30), and one bit for selecting between open loop and closed loop control by the active trim control unit. In addition, the control unit 34 includes an 8-bit register Margin[7:0] in which the data of that one of the Marginhigh, Marginnom, and Marginlow values that is selected by the two control bits can be stored.

The control unit 34 also includes a 10-bit register Vtarget [9:0] in which a digital target value of the output voltage of the controlled converter 10 is stored. This register is required in any event in the control unit 34, for example for use in determining over-voltage (OV) and under-voltage (UV) conditions by calculation of differences between the actual output voltage Vout of the converter 10, monitored by the control unit 34 via the ADC 36, and the desired (target) voltage value.

Figure 3:
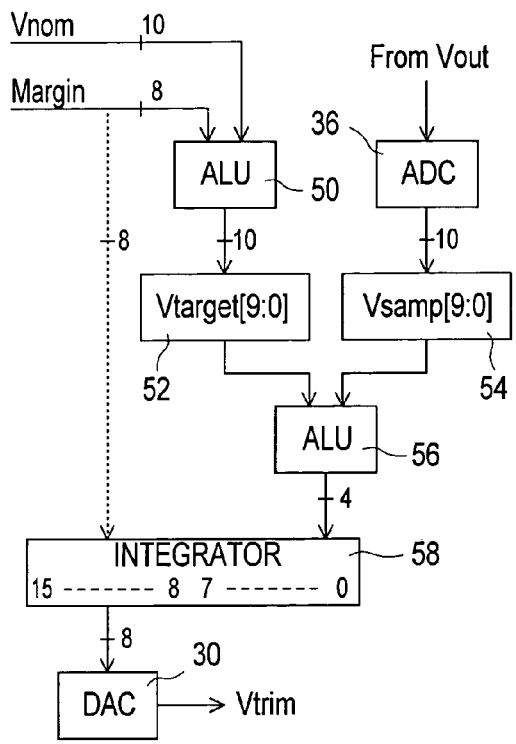
FIG. 3 is a functional diagram illustrating closed loop control by the control unit of FIG. 1 in accordance with an embodiment of the invention.
Figure 4:
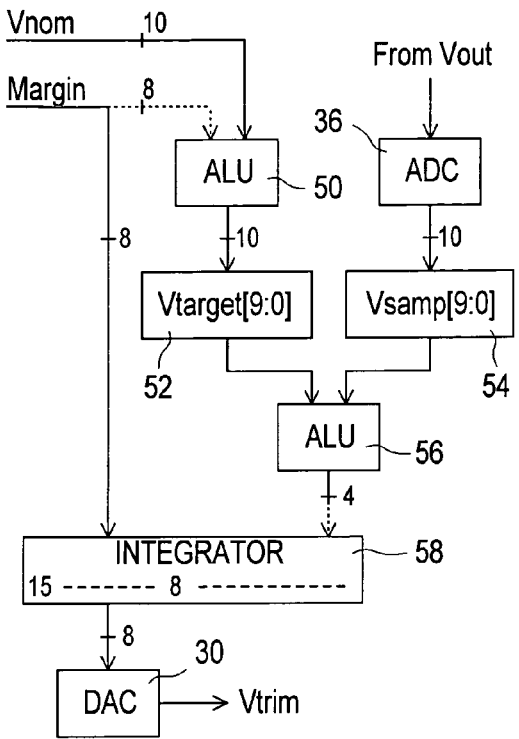
FIG. 4 is a functional diagram illustrating open loop control by the control unit of FIG. 1 in accordance with an embodiment of the invention.

FIG. 3 illustrates functioning of the control unit 34 for closed loop control by the active trim control unit, and FIG. 4 illustrates functioning of the control unit 34 for open loop control by the active trim control unit. For comparison, the functional layouts in FIGS. 3 and 4 are similar and corresponding references are used in the two figures, but in each figure functional paths that are not used are shown by dashed lines.

The control data Trimctrl downloaded from the store 38 to the control unit 34 is examined to determine whether closed loop or open loop control is desired, and to determine which of the three margin values is to be used. For closed loop active trim control as shown functionally in FIG. 3, if Marginhigh is selected, then this 8-bit offset value and the 10-bit value Vnom are supplied to an ALU (arithmetic logic unit) function 50 where they are added to produce a 10-bit target value which is loaded into the Vtarget register 52. If Marginlow is selected, then this 8-bit offset value and the 10-bit value Vnom are supplied to the ALU function 50 where the Marginlow offset is subtracted from the value Vnom, the resulting 10-bit target value again being loaded into the Vtarget register 52.

Similarly, the Marginnom value can be selected by the control data Trimctrl if margining is not required; the 2 bits of the control data Trimctrl for selecting the respective margin value to be used can also allow for the Marginnom offset value to be selectively added to or subtracted from the value Vnom in the ALU function 50, so that trim adjustments above or below the nominal value Vnom can be determined.

It is observed that the ALU function 50 is global, i.e. the control unit 34 requires only one ALU for all of its arithmetic functions for all of the power supplies that are controlled. In addition, it is observed that the over-voltage (OV) and under-voltage (UV) thresholds referred to above are offsets from the target voltage in the Vtarget register 52, so that the closed loop control function of FIG. 3 provides the advantage that during margining the OV and UV thresholds track the target voltage.

During normal closed loop control, i.e. after any initial start-up delay and after the voltage Vout has exceeded any required start-up voltage, the output voltage Vout of the converter 10 is monitored via the ADC 36 and a corresponding 10-bit digital sampled value is stored in a Vsamp[9:0] register 54. If active trim is enabled by the control data Trimctrl, then an ALU function 56 produces a 4-bit difference or error signal Verr between the contents of the registers 52 and 54, and supplies this to the least significant bit positions of a 16-bit integrator 58, constituted for example by an accumulator which can comprise an up-down counter. The 8 most significant bits [15:8] of the integrator 58 are supplied as an 8-bit value to the DAC 30, which produces a corresponding trim control voltage Vtrim.

In the event of any change in the control data Trimctrl, these steps are repeated, with the target voltage being re-determined in accordance with the control data.

The control function of FIG. 3 requires storage for the 4-bit control word as well as the 16-bit integrator 58, for a total of 20 bits of storage compared with the 27-bit total of the conventional arrangement as discussed above, other storage requirements being similar for the two different control arrangements (for example, the Vtarget register 52 is required in each case for comparisons for OV and UV thresholds).

If the control data Trimctrl indicates that open loop control is to be used, then as shown in FIG. 4 the margin value selected by the control data Trimctrl is loaded into the most significant 8 bit positions of the integrator 58, the lower 8 bit positions of which are not used in this case. The DAC 30 produces the trim voltage Vtrim from this margin value in the integrator 58. Thus the upper 8 bit positions of the integrator 58 correspond to the Margin register of FIG. 2.

As also shown in FIG. 4, in this case the nominal value Vnom is also loaded via the ALU function 50 into the Vtarget register 52, to be used for OV and UV threshold comparisons in conjunction with the ADC 36, register 54, and ALU function 56 in a similar manner to that described above with reference to FIG. 3, except that in this case the OV and UV thresholds do not track the margined output voltage Vout. It can be seen from FIG. 4 that in this case there is no output from the ALU function 56 to the integrator 58, so that there is no closed feedback loop for the active trim control.

For open loop control as shown in FIG. 4, the Marginhigh, Marginnom, and Marginlow values can be determined in conventional manner. For example, for the converter 10 to produce its nominal value of the output voltage Vout, the value Marginnom can be used in the open loop control function of FIG. 4 and can be chosen to correspond to the reference voltage Vref of the converter 10 in FIG. 1. As in the case of the closed loop control of FIG. 3, in the open loop control of FIG. 4 in the event of any change in the control data Trimctrl the relevant margin value and the value Vnom are reloaded as described above. The open loop control of FIG. 4 does not require any bit storage locations in addition to those of the closed loop control of FIG. 3.

The control loops must operate in a stable manner not only when the output voltage Vout is being maintained at a desired value, but also for changes between desired values, for example when a margin is changed, and for start-up when the output voltage Vout changes from an initial value (typically zero or near zero) to a desired value. It has been found that controlling the output voltage Vout for a substantially linear change, at a relatively slow rate compared with the response speed of the closed loop within the converter 10, between a current value and a desired value provides a desirable stability. The use of the integrator 58 in the closed loop control of FIG. 3 also enhances stability of this arrangement, because this constitutes a linear system. This is distinct from the known arrangement of a capacitor and comparator, which is a non-linear system (for example as explained by DeLurio and Hall in the reference identified above) and is more prone to instability.

To facilitate start-up, the control arrangement can be used in the open loop configuration of FIG. 4 until the output voltage Vout, as monitored via the ADC 36, exceeds a threshold value, and the integrator 58 can be initialized by loading its 8 most significant bit positions with a desired Marginnom value, corresponding to the reference voltage Vref of FIG. 1 as described above.

Figure 5:
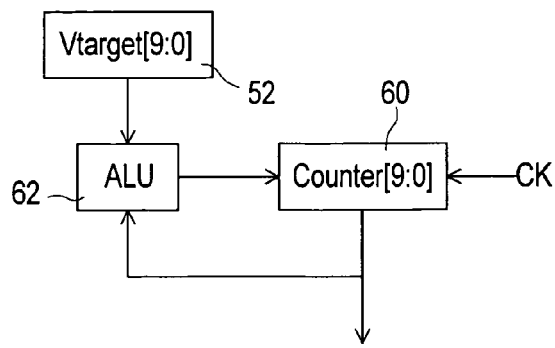
FIG. 5 illustrates a modification of the functional diagram of FIG. 3 for facilitating stable trim changes.

FIG. 5 illustrates a modification of the functional diagram of FIG. 3 for facilitating subsequent stable trim changes. This can be used with either the closed loop control of FIG. 3 or the open loop control of FIG. 4.

Referring to FIG. 5, the 10-bit Vtarget register 52 as described above is supplemented by a 10-bit up-down counter 60 and an ALU function 64. Instead of using the output of the register 52 as the target voltage value as described above, the output of the counter 60 is used as the target voltage value. The counter 60 can be initialized for start-up in a similar manner to the register 52. Subsequent step changes of the value in the register 52 are reflected only relatively slowly by the counter 60.

To this end, the ALU function 64 determines any difference between the outputs of the register 52 and the counter 60, and in response to any difference enables the counter 60 to count pulses of a clock signal CK in a direction to reduce the difference to zero. The clock signal CK can have a slow pulse rate, for example of the order of one pulse every 10 ms, so that changes of the count of the counter 60, and hence the output voltage Vout of the converter 10, take place very gradually. Consequently, instability due to the presence of the two closed control loops is substantially avoided.

The relatively slow rate of change of the output voltage Vout provided in this manner also ensures that this output voltage is more easily kept within the OV and UV thresholds, which with the closed loop control of FIG. 3 track the target voltage value as described above.

Although as described above the active trim control unit comprises digital functions which operate on digital values, with conversions to and from corresponding analog values being provided by the DAC 30 and the ADC 36, it can be appreciated that any of these digital functions can alternatively be carried out in an analog manner on analog values.

Although particular embodiments of the invention are described above, it can be appreciated that modifications, variations, and adaptations may be made without departing from the scope of the invention as defined in the claims.

The invention claimed is:

1. A method of trimming an output voltage of a power supply, comprising the steps of:
   storing values representing a nominal value of the output voltage, a plurality of margin values, and control data in a non-volatile store; and
   in a control unit:
   in dependence upon the control data, selecting one of the plurality of margin values stored in the non-volatile store, combining it with the nominal value of the output voltage stored in the non-volatile store to produce a target value of the output voltage, and storing the target value in a register of the control unit;
   monitoring the output voltage of the power supply;
   integrating differences between monitored values of the output voltage and the target value to produce a control signal; and supplying the control signal to a trim input of the power supply to trim the output voltage of the power supply to reduce said differences.

2. A method as claimed in claim 1 wherein said values are digital values, the method including the step of converting the monitored output voltage to a digital value and converting a digital value representing the control signal to an analog signal.

3. A method as claimed in claim 2 wherein the step of integrating differences comprises forming said differences using an arithmetic logic unit and accumulating the differences in less significant bit positions of an accumulator having more significant bit positions from which the control signal is derived.

4. A method as claimed in claim 2 wherein the step of combining a selected one of the margin values with the nominal value of the output voltage to produce a target value of the output voltage is responsive to a change of the control data to make any change of the target value gradually at a slow rate.

5. A method as claimed in claim 2 wherein the control unit is responsive to an indication of open loop control in the control data to produce the control signal from a selected one of the plurality of margin values instead of integrating differences between monitored values of the output voltage and the target value, and to supply the nominal value of the output voltage as the target value of the output voltage.

6. A control arrangement for trimming an output voltage of a power supply, comprising:
    a non-volatile store for storing values representing a nominal value of the output voltage, a plurality of margin values, and control data; and
    a control unit comprising:
    logic responsive to the control data for combining the nominal value of the output voltage stored in the non-volatile store with a selected one of the plurality of margin values stored in the non-volatile store to produce a target value of the output voltage;
    a register for storing the target value;
    a monitoring circuit for monitoring the output voltage of the power supply to produce monitored values of the output voltage;
    logic for forming differences between the monitored values of the output voltage and the target value; and
    an integrator for integrating said differences to produce a control signal for supply to a trim input of the power supply to trim the output voltage of die power supply to reduce said differences.

7. A control arrangement as claimed in claim 6 wherein the integrator comprises an accumulator having less significant bit positions to which said differences are supplied and more significant bit positions from which the control signal is derived.

8. A control arrangement as claimed in claim 6 and including a digital-to-analog converter for producing the control signal from a digital value representing the control signal.

9. A control arrangement as claimed in claim 6 wherein the monitoring circuit comprises an analog-to-digital converter for producing the monitored values as digital values.

10. A control arrangement as claimed in claim 6 wherein the logic for combining the nominal value of the output voltage with a selected one of the margin values to produce a target value of the output voltage includes a circuit responsive to a change of the control data to make any change of the target value occur gradually at a slow rate.

11. A control arrangement as claimed in claim 6 wherein the control unit is responsive to an indication of open loop control in the control data to produce the control signal from a selected one of the plurality of margin values instead of integrating said differences, and to supply the nominal value of the output voltage as the target value of the output voltage.

12. In combination, a control arrangement as claimed in claim 6 and a power supply having a trim input connected to receive the control signal from the control arrangement for trimming the output voltage of the power supply.

13. A controller for a power supply having a trim input for trimming an output voltage of the power supply, the controller comprising:
    an analog-to-digital converter for producing a digital value representing an output voltage of the power supply;
    a digital-to-analog converter for producing a trim signal, for coupling to the trim input of the power supply, from a digital value representing the control signal;
    storage locations for storing information for producing the digital value representing the control signal, the storage locations including locations for bits of control data and bits of a target value register;
    logic responsive to the control data for selecting one of a plurality of digital values, stored in a non-volatile store, representing respective margins for the output voltage of the power supply and combining it with a digital value, stored in the non-volatile store, representing a nominal value of an output voltage of the power supply to produce a digital value representing a target value of the output voltage of the power supply and for storing this in the target value register;
    logic for forming a difference between the target value in the target value register and the digital value representing the output voltage of the power supply; and
    an integrator for integrating successive values of said difference to produce the digital value representing the control signal.

14. A controller as claimed in claim 13 wherein the integrator comprises an accumulator having less significant bit positions to which the successive values of said difference are supplied and more significant bit positions from which the digital value representing the control signal is derived.

15. A controller as claimed in claim 13 wherein the logic to produce the digital value representing the target value of the output voltage of the power supply includes a circuit responsive to a change of the control data to make any change of the digital value representing the target value occur gradually at a slow rate.

16. A controller as claimed in claim 13 wherein the logic responsive to the control data is responsive to an indication of open loop control in the control data to produce digital value representing the control signal from a selected one of the plurality of margin values instead of integrating successive values of said difference, and to supply the digital value representing the nominal value of the output voltage of the power supply as the target value.

17. A controller as claimed in claim 13 and including a non-volatile store for storing the control data and digital values representing said margins and nominal value of the output voltage of the power supply.

18. In combination, a controller as claimed in claim 13 and a power supply, the power supply having an output coupled to an input of the analog-to-digital converter and having a trim input coupled to receive the trim signal from the digital-to-analog coverter.

* * * * *

UNITED STATES PATENT AND TRADEMARK OFFICE
CERTIFICATE OF CORRECTION

PATENT NO.         : 7,501,801 B2                                           Page 1 of 1
APPLICATION NO.    : 11/169629
DATED              : March 10, 2009
INVENTOR(S)        : David A. Brown et al.

It is certified that error appears in the above-identified patent and that said Letters Patent is hereby corrected as shown below:

Column 9, line 5, Claim 2, "...die..." should read --...the...--;
Column 9, line 46, Claim 6, "...die..." should read --...the...--; and
Column 10, line 64, Claim 18, "...coverter..." should read --...converter...--.

Signed and Sealed this

Twenty-third Day of June, 2009

JOHN DOLL
*Acting Director of the United States Patent and Trademark Office*